June 23, 1936.  E. R. EVANS  2,044,901

FREEWHEELING DEVICE WITH AUTOMATIC CONTROL

Filed Aug. 16, 1933   2 Sheets-Sheet 1

INVENTOR
Edwin R. Evans.
BY Arthur Wright
ATTORNEY

June 23, 1936.    E. R. EVANS    2,044,901
FREEWHEELING DEVICE WITH AUTOMATIC CONTROL
Filed Aug. 16, 1933    2 Sheets-Sheet 2

INVENTOR
Edwin R. Evans.
BY
ATTORNEY

Patented June 23, 1936

2,044,901

UNITED STATES PATENT OFFICE 2,044,901

FREEWHEELING DEVICE WITH AUTOMATIC CONTROL

Edwin R. Evans, Chicago, Ill.

Application August 16, 1933, Serial No. 685,382

13 Claims. (Cl. 192—48)

My invention relates to devices adapted to be used in automotive vehicles of all kinds, to provide free wheeling for the same.

The object of my invention is to provide an automatically controlled free wheeling device which is operative both for forward and reverse drive with free wheeling between the forward and rearward positons, and which is capable also of manual control to lock the free wheeling device out of operation. Further objects of my invention will appear from the following detailed description thereof.

Figure 1:
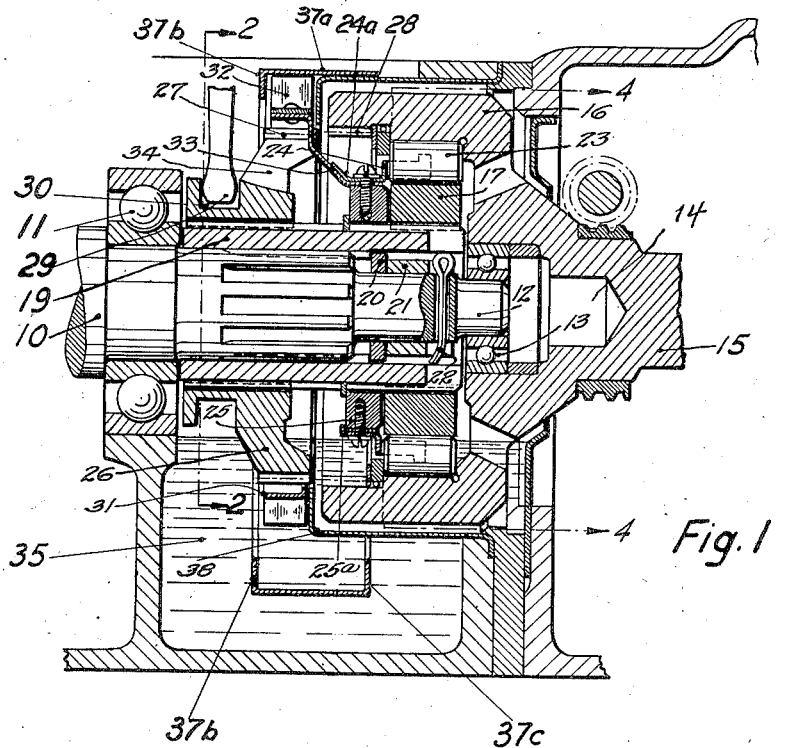
Fig. 1 is a vertical section viewed from the side.
Figure 3:
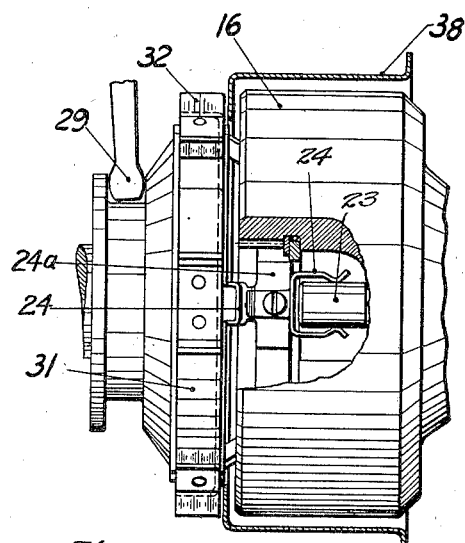
Fig. 3 is a side view in part section showing the roller mounting.
Figure 4:
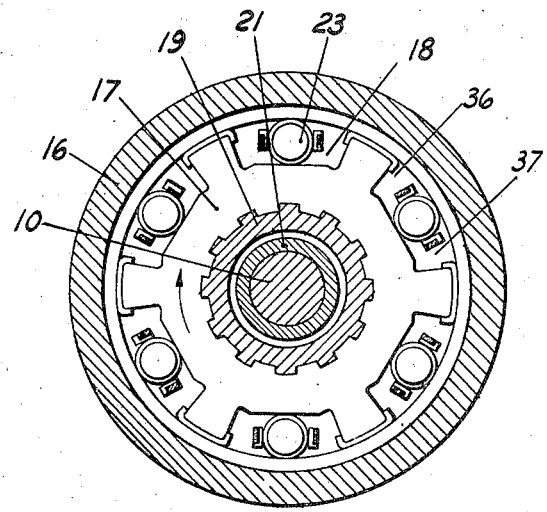
Fig. 4 is a cross-section of the free wheeling drive member in the plane denoted by 4—4 of Fig. 1.
Figure 5:
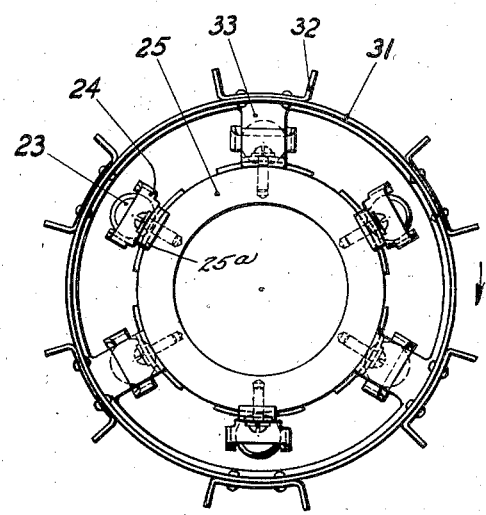
Fig. 5 is a detailed elevation of the roller control structure.

Referring to Fig. 1, I have provided a driving shaft 10, supported on the usual bearings 11. An extension 12 of the shaft 10 is supported in a pilot bearing 13 in a recess 14 of a driven shaft 15. Formed integrally with the driven shaft 15 is a cup-shaped member 16 which constitutes the outer or driven ring of the free wheel drive. An inner or driving member 17 having tapered peripheral recesses 18, Fig. 4, is splined to a sleeve 19 which in turn is splined to the driving shaft 10. A ring 20, backed by a bushing 21 fastened by a cotter pin 22 through the shaft 10, restrains the sleeve 19 from endwise motion on the shaft 10. Each tapered recess 18 of the driving member 17 contains a roller 23, guided by a spring clip 24, as shown in Fig. 3. The clips 24 are fastened to a ring 25, rotatably supported on the sleeve 19. Three of these clips have tail pieces 24a, three of which contact with arms 33 hereinafter referred to and three of which are bent over the ring 25 at 25a. These spring clips 24 are of sufficient strength to resist the rollers 23 being dragged over into reverse position but are flexible enough to permit all the rollers 23 to be forced into engagement at the same time. I have also provided a clutch member 26, slidably splined on the sleeve 19 and having external teeth 27 adapted to engage internal teeth 28 cut in the end of the cup-shaped member 16. A manually shiftable arm 29 engages a groove 30 in the clutch member 26. An external ring 31, carrying a plurality of paddles 32, has lugs 33 which extend through slots 34 in the clutch member 26 and are fastened to the ring 31 and the ring 25 so as to bring about the movement of the rollers 23 into the forward tapers 36 or the reverse tapers 37. If desired, the lugs 33, paddles 32 and clips 24 could all be made of one piece. A stationary casing 38 surrounding the driven member 16, prevents the latter from imparting motion to the oil bath by surface friction, which motion of the oil would reduce the drag of the paddles 32. Also I may provide an oil runway 37a on the casing 38 to allow the oil to be carried up further by the paddles 32 to increase the friction thereon by carrying the oil up further thereon. Lips 37b and 37c would tend to retain the oil therein.

Figure 2:
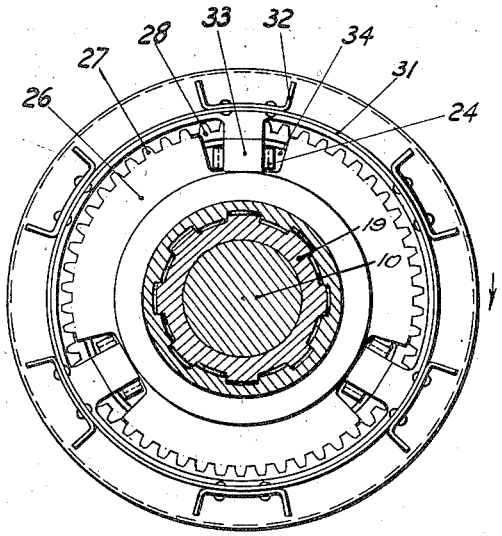
Fig. 2 is a cross-section in the plane denoted by 2—2 of Fig. 1.

In the operation, when the sleeve 19 is rotated in the forward direction, as shown by the arrow in Figs. 2 and 4, the rollers 23 are carried around by the member 17. The rollers 23, through the clips 24, carry around the ring 25 and with it the external ring 31. The paddles 32 dip in the oil bath 35, the oil setting up a resistance to their rotation. The drag thus produced is transmitted to the rollers 23, causing them to wedge into the forward driving tapers 36 between the driving member 17 and the driven member 16 of the free wheel unit. The member 17 now drives the member 16 positively, the two being locked together by the rollers 23. Should the speed of the outer member 16 exceed that of the driving member 17, the former rolls the rollers 23 out of wedging engagement in the tapers 36, allowing the member 16 to overrun to produce free wheeling. The drag of the paddles 32 continues to retard the rollers, preventing them from rolling forward into the reverse tapers 37. See Fig. 4. Should the direction of rotation be reversed, however, the drag of the paddles also reverses, urging the rollers into the reverse-drive tapers 37 and causing the reverse drive to take place in a manner similar to that already described.

When it is desired to lock out the free wheeling action the clutch member 26 is slid to the right in Fig. 1 by means of the manually operable lever 29 until the external teeth 27 of the member 26 engage the internal teeth 28 of the driven member 16, providing a direct drive through the unit.

While I have described my invention above in detail I wish it to be understood that many changes may be made therein without departing from the spirit of the same.

I claim:

1. A free wheeling device comprising a driving member, a driven member, a set of rollers adapted to couple the driving member to the driven member said device having tapered pockets for the rollers, said pockets being so arranged that free wheeling will take place when the driven member over-runs the driving member, and means operative independently of manual actuation due to the inertia of a body of oil for controlling the operation of the free wheeling device to throw it into driving position.

2. A free wheeling device comprising a driving member, a driven member, a set of rollers adapted to couple the driving member to the driven member said device having tapered pockets for the rollers, said pockets being so arranged that free wheeling will take place when the driven member over-runs the driving member, and means operative independently of manual actuation due to the inertia of a body of oil for controlling the operation of the free wheeling device to throw it into driving position, said means comprising cooperating devices, one of which is retardably connected to the driving member and means for retarding the same with regard to the driving member so as to throw the said rollers into driving position.

3. A free wheeling device comprising a driving member, a driven member, a set of rollers adapted to couple the driving member to the driven member said device having tapered pockets for the rollers, said pockets being so arranged that free wheeling will take place when the driven member over-runs the driving member, and means operative independently of manual actuation due to the inertia of a body of oil for controlling the operation of the free wheeling device to throw it into driving position, said means comprising cooperating devices, one of which is retardably connected to the driving member and means for retarding the same upon the reverse drive of the driving member, providing a reverse drive, so as to throw the said rollers into driving position.

4. A free wheeling device comprising a driving member, a driven member, a set of rollers adapted to couple the driving member to the driven member said device having tapered pockets for the rollers, said pockets being so arranged that free wheeling will take place when the driven member over-runs the driving member, and an oil retardable means dependent for action upon the inertia of a body of oil for controlling the operation of the free wheeling device.

5. A free wheeling device comprising a driving member, a driven member, a set of rollers adapted to couple the driving member to the driven member said device having tapered pockets for the rollers, said pockets being so arranged that free wheeling will take place when the driven member over-runs the driving member, and an oil retardable means dependent for action upon the inertia of a body of oil for controlling the operation of the free wheeling device, said means comprising cooperating devices, one of which is retardably connected to the driving member and means for retarding the same with regard to the driving member so as to throw the said rollers into driving position.

6. A free wheeling device comprising a driving member, a driven member, a set of rollers adapted to couple the driving member to the driven member said device having tapered pockets for the rollers, said pockets being so arranged that free wheeling will take place when the driven member over-runs the driving member, and an oil retardable means dependent for action upon the inertia of a body of oil for controlling the operation of the free wheeling device, said means comprising cooperating devices, one of which is retardably connected to the driving member and means for retarding the same upon the reverse drive of the driving member, providing a reverse drive, so as to throw the said rollers into driving position.

7. A free wheeling device comprising a driving member, a driven member, a set of rollers adapted to couple the driving member to the driven member said device having tapered pockets for the rollers, said pockets being so arranged that free wheeling will take place when the driven member over-runs the driving member, and means including a series of oil retardable paddles for controlling the operation of the free wheeling device.

8. A free wheeling device comprising a driving member, a driven member, a set of rollers adapted to couple the driving member to the driven member said device having tapered pockets for the rollers, said pockets being so arranged that free wheeling will take place when the driven member over-runs the driving member, and means including a series of oil retardable paddles for controlling the operation of the free wheeling device, said means comprising cooperating devices, one of which is retardably connected to the driving member and means for retarding the same with regard to the driving member so as to throw the said rollers into driving position.

9. A free wheeling device comprising a driving member, a driven member, a set of rollers adapted to couple the driving member to the driven member said device having tapered pockets for the rollers, said pockets being so arranged that free wheeling will take place when the driven member over-runs the driving member, and means including a series of oil retardable paddles for controlling the operation of the free wheeling device, said means comprising cooperating devices, one of which is retardably connected to the driving member, and means for retarding the same upon the reverse drive of the driving member, providing a reverse drive, so as to throw the said rollers into driving position.

10. A free wheeling device comprising a driving member, a driven member, a set of rollers adapted to couple the driving member to the driven member said device having tapered pockets for the rollers, said pockets being so arranged that free wheeling will take place when the driven member over-runs the driving member, means including a series of oil retardable paddles for controlling the operation of the free wheeling device, and manual means for locking the free wheeling device out of operation.

11. A free wheeling device comprising a driving member, a driven member, a set of rollers adapted to couple the driving member to the driven member said device having tapered pockets for the rollers, said pockets being so arranged that free wheeling will take place when the driven member over-runs the driving member, means including a series of oil retardable paddles for controlling the operation of the free wheeling device, said means comprising cooperating devices, one of which is retardably connected to the driving member and means for retarding the same with regard to the driving member so as to throw the said rollers into driving position, and manual means for locking the free wheeling device out of operation.

12. A free wheeling device comprising a driving member, a driven member, a set of rollers adapted to couple the driving member to the driven member said device having tapered pockets for the rollers, said pockets being so arranged that free wheeling will take place when the driven member over-runs the driving member, means including a series of oil retardable paddles for controlling the operation of the free wheeling device, said means comprising cooperating devices, one of which is retardably connected to the driving member and means for retarding the same upon the reverse drive of the driving member, providing a reverse drive, so as to throw the said rollers into driving position, and manual means for locking the free wheeling device out of operation.

13. A free wheeling device comprising a driving member, a driven member, a set of rollers adapted to couple the driving member to the driven member said device having tapered pockets for the rollers, said pockets being so arranged that free wheeling will take place when the driven member over-runs the driving member, and an oil retardable means dependent for action upon the inertia of a body of oil having an oil runway for controlling the operation of the free wheeling device.

EDWIN R. EVANS.